April 13, 1926.
S. OTIS ET AL
APPARATUS FOR SELECTIVELY SUPPLYING WASHOUT WATER
AND REFILLING WATER TO BOILERS
Filed March 12, 1923
1,580,525
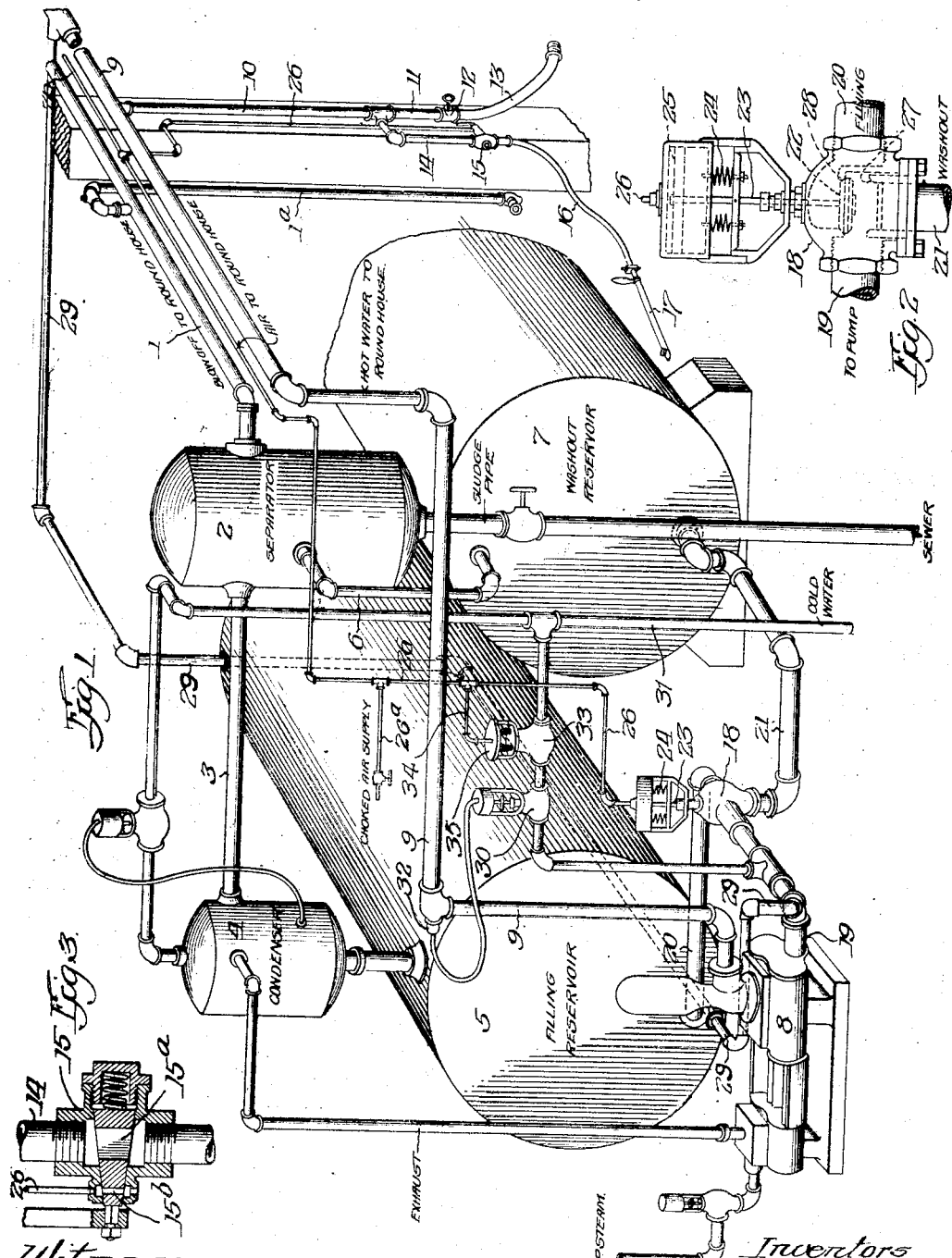

Patented Apr. 13, 1926.

1,580,525

UNITED STATES PATENT OFFICE.

SPENCER OTIS, OF BARRINGTON, AND FRANK S. WICHMAN, OF HIGHLAND PARK, ILLINOIS.

APPARATUS FOR SELECTIVELY SUPPLYING WASHOUT WATER AND REFILLING WATER TO BOILERS.

Application filed March 12, 1923. Serial No. 624,652.

*To all whom it may concern:*

Be it known that we, SPENCER OTIS and FRANK S. WICHMAN, citizens of the United States, residing, respectively, at Barrington, in the county of Cook and State of Illinois, and at Highland Park, in the county of Lake and State of Illinois, have jointly invented certain new and useful Improvements in Apparatus for Selectively Supplying Washout Water and Refilling Water to Boilers, of which the following is a specification.

This invention relates to apparatus for washing out and refilling boilers, in which, for the sake of economy, a different grade of water is used for washing from that employed for refilling.

One object of the invention is to provide an apparatus in which a single supply line may be employed for delivering either grade of water to the boiler, and in which the grade of water admitted to the supply line will be automatically determined from the point of consumption.

Another object is to provide a novel means for circulating water through the supply line and keeping its temperature up to a desired degree during periods when the line is not being drawn upon for water, and to accomplish this without discharging from the supply line into the reservoir and consequent necessity of continually drawing fresh water from the reservoir and pumping it into the line, and the addition thereto of tempering water as heretofore practiced, which resulted in undesirable building up of the volume of water in the reservoir.

The invention proceeds upon the principle of connecting a single supply line with both of two water sources, for instance, a washout water reservoir and a filling water reservoir, through the interposition of a selecting valve adapted to determine which source shall deliver into the supply line at any time, and providing at the discharge end of the supply line, a washout valve and a refilling valve, one of which, preferably the washout valve, is adapted by its own opening to cause the selecting valve to open in a manner to connect the washout water tank to the supply line, and by its closing, to leave the selecting valve free to assume a position in which the filling water reservoir is in communication with the supply line; the supply line being preferably also provided with thermostatically controlled means for delivering an increment of tempering water so long as the temperature of water flowing through it is inappropriate to the purpose for which it is being drawn, and the controlling valve at the delivery end being also made to control the tempering water so that change of temperature of the water supply occurs only when the controlling valve is open. The circulation of water through the supply line is accomplished by extending the circulating line from the end of the supply line without interruption to the intake side of the circulating pump so that the same water will be continually circulated through the supply line; and in order that the temperature of this water may be kept up to the desired degree a sufficient length of the circulating line, before reaching the pump, is located in one of the supply reservoirs, preferably the filling reservoir, to restore the temperature of water returning from the supply line to the degree which it should have in being again fed to the supply line by the pump.

The apparatus is preferably embodied in a system in which the washout water and the heat units for the filling water are obtained mainly from the contents of a boiler blown off as a preliminary to the steps of washing and refilling.

In the accompanying drawing, in which the preferred embodiment of the invention is shown by way of illustration—

Figure 1 is a perspective view of a boiler blowoff, washout, and refilling apparatus in which the subject-matter of the present invention is embodied.

Figure 2 is a detail view of the selecting valve; and Figure 3 is a detail view of the delivery valve that is adapted to control the selecting valve.

1 represents a blowoff line adapted to be connected through a drop pipe $1^a$ with a locomotive to be blown off, and 2 represents a separator which delivers volatiles of the blown off products through a crossover pipe 3 to a condenser 4 whence water of condensation discharges into a filling reservoir 5, and delivers the water constituent of the blown off products through a pipe 6 into the washout reservoir 7. 8 represents a pump adapted to take water from either of the reservoirs 5 or 7 and deliver it into a single supply line 9 under a head of pressure sufficient for the purposes for which it is to be used. Supply line 9 is connected with one or more drops 10 through which water may be supplied to the boiler to be treated; but drop 10 is provided with two independent outlets, namely, a branch 11 controlled by valve 12 and delivering to a boiler filling hose 13, and a branch 14 controlled by a valve 15 and delivering through a hose 16 to a washout nozzle 17.

In order that a grade of water can be delivered through supply line 9 that will be appropriate to the particular function performed by the respective connections 13 and 16, a selecting valve 18 is introduced between the intake 19 of the pump 8 and the branches 20 and 21 leading, respectively, to the filling reservoir 5 and the washout reservoir 7, said selecting valve being adapted to assume two positions, one of which will open the washout reservoir to the pump intake and the other of which will open the filling reservoir thereto.

A valve capable of selectively connecting the pump with the respective reservoirs is illustrated in Figure 2, wherein valve disk 22, having its stem 23 controlled reciprocally by springs 24 and piston 25, may be moved downward to its seat 27 by air pressure supplied through pipe 26, and when such air pressure is released, it will be moved by tension springs 24 upward until arrested by its seat 28. Pump intake 19 being connected with the space between the valve seats, and pipes 20 and 21 being arranged to communicate, respectively, above and below the valve seats, it follows that the described movements of the valve under the influences stated will determine the reservoir from which the pump will draw.

In order that the selecting valve 18 may be controlled from the delivery end of the single supply main, one of the valves, preferably the washout valve 15, is provided (as shown in Figure 3) with not only a water port 15ª but with an air port 15ᵇ adapted to open the pipe 26 leading from the selecting valve 18 so that as long as the valve 15 is open to release washout water into the hose 16, pressure over the piston 25 of selecting valve 18 will be relieved and the valve disk 22 can assume the position shown in Figure 2 which will open the washout tank to the pump 8, but as soon as the valve 15 is closed and leakage through air pipe 26 is stopped, air pressure supplied by an air pipe 26ª will again build up over the piston 25 of the valve 18, springs 24 will be overcome, and the valve disk 22 will be returned to its normal position upon the seat 27, so that the filling reservoir will be in communication with the pump. Air pipe 26ª will be choked or throttled to a point at which the amount of leakage occurring during the washout operation will be relatively small and therefore negligible from an economic standpoint.

The present invention provides for thermostatically tempering the water supplied through the single line 9 when said water is to be used for washout purposes, without having the tempering equipment respond to high temperatures of water used for filling purposes, and accomplishes this result by arranging a dual control for the tempering equipment, one portion of which consists of any suitable known delivery valve 30 for opening cold water pipe 31 into the single line, for instance, via the pump discharge 19, and the controlling thermostat 32 for said valve 30, while the other part of said dual control comprises a valve 33 controlled by means located at the washout delivery, for instance, the same air valve 15 and pressure pipe 26 that is employed for actuating the water selecting valve 18, but having a branch 34 leading to a pneumatic valve actuator 35 which may be identical in construction and function with the valve actuator 23, 24, 25 that controls the water selecting valve 18. Hence when washout valve 15 is opened at the drop pipe, and washout water enters the single supply line, cold water valve 33 will likewise be opened and cold water from pipe 31 will be released as far as thermostatic valve 30, so that the last named valve is then free to supply tempering water to the discharge side of the pump in such quantity as may be enforced by the thermostat 32 which is in the line of flow of the water to be tempered.

29 represents a circulating line leading from the end of the supply line 9. Instead of terminating at the reservoir in accordance with previous practice, the circulating line 29 enters one end of the filling reservoir 5, as shown at the rear end of said reservoir in Figure 1, extends entirely through said reservoir without communicating therewith, and emerges from the front end thereof, as shown in the same figure, whence it passes to the intake pipe 19 of the pump. Through this means, a pump equipped with the usual automatic throttle control which governs its output in accordance with the load on the line, will keep up a constant circulation from the pump through the supply line 9, and thence through the circulating line 29 and back to the intake of the pump, and the temperature of the water flowing therethrough would be kept up to the desired degree by the absorption of heat units from the reservoir through which the circulating line passes. But as soon as valve 12 or 15 at a locomotive station is opened, the action of the pump will be increased in accordance with usual practice to deliver a volume of water necessary for the service to be performed.

We claim:

1. In a boiler washout and refill apparatus, suitably controlled independent deliveries for washout and refill water, a single supply line for both deliveries, independent reservoirs for washout and refill water, valved connections between the single supply line and both reservoirs, and means at a delivery for selectively opening said valved connections to the supply line.

2. In a boiler washout and refill apparatus, suitably controlled independent deliveries for washout water and refill water, a single supply line for both deliveries, independent reservoirs for washout water and refill water, and a selecting valve connecting both of said reservoirs with said supply line; means being provided at one of the deliveries for determining the position of said selecting valve.

3. In a boiler washout and refill apparatus, suitably controlled independent deliveries for washout water and refill water, a single supply line for both deliveries, independent reservoirs for washout water and refill water, and a selecting valve connecting both of said reservoirs with said supply line; one of said deliveries having means for determining the position of said selecting valve.

4. In a boiler washout and refill apparatus, suitably controlled independent deliveries for washout water and refill water, a single supply line for both deliveries, independent reservoirs for washout water and refill water, and a selecting valve connecting both of said reservoirs with said supply line; said selecting valve being adapted to normally open one of said reservoirs to the supply line, and one of said deliveries being adapted to shift the valve to close the normally opened one and open the other of said reservoirs to the delivery line.

5. In a boiler washout and refill apparatus, suitably controlled independent deliveries, independent water sources, a single supply line connected with said deliveries, a valve for selectively connecting said sources with said supply line, means for adding tempering water to said supply line, and means through which a delivery controls said valve and the addition of tempering water.

6. In a boiler washout and refill apparatus, suitably controlled washout and refill connections, a single supply line for said connections, a washout reservoir, a refill reservoir, a selecting valve adapted to connect either of said reservoirs with said supply line and disconnect the other therefrom, a tempering water pipe communicating with said supply line, having a valve for controlling it, and means whereby said washout connection controls said selecting valve and the valve for said tempering water pipe.

7. In a boiler washout and refill system, suitably controlled washout and refill connections, a single supply line feeding both said connections, a washout reservoir and a refill reservoir, a selecting valve adapted to connect either of said reservoirs with said supply line and disconnect the other therefrom, a tempering water pipe communicating with said supply line, a thermostatic valve controlling said tempering water pipe and responsive to heat effects in said supply line, a second valve controlling said tempering water pipe, and means whereby the washout connection controls both said selecting valve and said second valve.

Signed at Chicago, Illinois this 5 day of March, 1922.

SPENCER OTIS.
FRANK S. WICHMAN.